(12) United States Patent
Chandra et al.

(10) Patent No.: US 11,016,544 B2
(45) Date of Patent: May 25, 2021

(54) SYSTEM AND METHOD FOR ADAPTIVE THERMAL MANAGEMENT OF BATTERY PACKS

(71) Applicant: Microsoft Technology Licensing, LLC, Redmond, WA (US)

(72) Inventors: Sachin Ramesh Chandra, Woodinville, WA (US); Jason Michael Battle, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 16/460,297

(22) Filed: Jul. 2, 2019

(65) Prior Publication Data

US 2021/0004065 A1    Jan. 7, 2021

(51) Int. Cl.
*G06F 1/20* (2006.01)
*G06F 1/16* (2006.01)

(52) U.S. Cl.
CPC ............ *G06F 1/203* (2013.01); *G06F 1/1616* (2013.01); *G06F 1/206* (2013.01)

(58) Field of Classification Search
CPC ......... G06F 1/203; G06F 1/1616; G06F 1/206
See application file for complete search history.

(56) References Cited

U.S. PATENT DOCUMENTS

| 8,762,097 | B2 | 6/2014 | Millet |
| 9,983,557 | B2 | 5/2018 | Park et al. |
| 10,725,510 | B2 * | 7/2020 | Ho ........................ G06F 1/206 |
| 2004/0133817 | A1 | 7/2004 | Choi |
| 2014/0108832 | A1 | 4/2014 | Yamaguchi |
| 2014/0245029 | A1 | 8/2014 | Jain et al. |
| 2017/0329374 | A1 | 11/2017 | Huang et al. |
| 2018/0067507 | A1 | 3/2018 | Nielsen et al. |
| 2018/0181171 | A1 | 6/2018 | Jang et al. |
| 2019/0058336 | A1 * | 2/2019 | Thompson ............. B60L 58/12 |
| 2019/0138067 | A1 | 5/2019 | Iwasa |
| 2020/0021115 | A1 * | 1/2020 | Files ...................... G06F 1/203 |

OTHER PUBLICATIONS

"International Search Report and Written Opinion Issued in PCT Application No. PCT/US20/033010", dated Sep. 24, 2020, 11 Pages.

* cited by examiner

*Primary Examiner* — Mischita L Henson
(74) *Attorney, Agent, or Firm* — Ray Quinney & Nebeker P.C.; Paul N. Taylor

(57) ABSTRACT

A method of determining a temperature of a component in an electronic device includes obtaining a posture of the electronic device, selecting a first temperature sensor from a plurality of temperature sensors based on the obtained posture, obtaining a first measured temperature from the first temperature sensor, determining the temperature of the component based on the first measured temperature from the first temperature sensor, and in accordance with the determined temperature meeting one or more criteria, adjusting performance of the component.

20 Claims, 6 Drawing Sheets

SYSTEM AND METHOD FOR ADAPTIVE THERMAL MANAGEMENT OF BATTERY PACKS

BACKGROUND

Background and Relevant Art

Mobile electronic devices in daily usage are commonplace. To increase portability of many mobile electronic devices, components of the electronic device are reduced in size and positioned in smaller housings. Reducing the size of the components and reducing the size of the housing create thermal management challenges. For example, in a conventional desktop computer, many electronic components, such as a processor, system memory, graphical processor, power supply, or other components generate heat, but the large housing allows airflow through the housing to cool the components.

In a laptop or other mobile electronic device, there is less volume for airflow, and hence more drag on the air. Thermal management of an electronic component, such as a battery or other power supply, can improve performance and/or increase the operational lifetime of the component. Accurate thermal measurements are needed for proper thermal management.

BRIEF SUMMARY

In some implementations, a method of determining a temperature of a component in an electronic device includes obtaining a posture of the electronic device, selecting a first temperature sensor from a plurality of temperature sensors based on the obtained posture, obtaining a first measured temperature from the first temperature sensor, determining the temperature of the component based on the first measured temperature from the first temperature sensor, and in accordance with the determined temperature meeting one or more criteria, adjusting performance of the component.

In some implementations, a method of determining a temperature of a component in an electronic device includes obtaining a posture of the electronic device, selecting a first temperature sensor from a plurality of temperature sensors based on the obtained posture, obtaining a first measured temperature from the first temperature sensor, obtaining a second measured temperature from a second temperature sensor of the plurality of temperature sensors, determining the temperature of the component by calculating a weighted average of the first measured temperature and the second measured temperature, and in accordance with the determined temperature meeting one or more criteria, adjusting performance of the component.

In some implementations, an electronic device includes a first portion, a second portion, a battery cell, a first temperature sensor, a battery protection circuit module (PCM), a second temperature sensor, a posture sensor, a processor, and a hardware storage device. The second portion is rotatable relative to the first portion around a hinge. The battery cell is located in the second portion. The first temperature sensor is positioned adjacent the battery cell and configured to measure a first temperature. The battery PCM is in electrical communication with the batter cell. The posture sensor is configured to measure an angular position of the first portion relative to the second portion. The processor is in data communication with the first temperature sensor, the second temperature sensor, and the posture sensor. The hardware storage device is in data communication with the processor and contains instructions stored thereon that, when executed by the processor, cause the processor to obtain a posture of the electronic device, select a first temperature sensor from a plurality of temperature sensors based on the obtained posture, obtain a first measured temperature from the first temperature sensor, obtain a second measured temperature from a second temperature sensor of the plurality of temperature sensors, and determine the temperature of the component by calculating a weighted average of the first measured temperature and the second measured temperature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for determining a temperature of an electronic component in an electronic device. More particularly, the present disclosure relates to determining a battery temperature of a device based on the posture of the device.

In some implementations, a component's performance is based upon the temperature of the component. For example, when a processor exceeds a threshold temperature it can be damaged. In other examples, when a battery cell is below a threshold temperature, a charging current can be increased to improve charging times.

In some implementations, a temperature sensor positioned adjacent to a component receives thermal energy from the component as well as from secondary heat sources in the electronic device. With newer form factors and postures made possible in hybrid and foldable electronic devices, a thermal profile can change when the electronic device is used in a different posture (e.g., different components may contribute different amounts to a temperature reading at the sensor based on the device posture). Therefore, in some circumstances, simply reading out (measuring) a temperature from a temperature sensor is insufficient to accurately determine the operating temperature of a particular device component.

For example, a foldable electronic device in different postures (lying flat on a table, open in an L-shape with, for instance, one portion serving as an input device, or closed outward on itself in an inverted or "canvas" mode) all cause very different thermal profiles for the components of the device. Additionally, the relative movement of the heat sources as the components of the electronic device move relative to one another can influence the temperature sensors, causing a first temperature measurement that changes based on the distance to a heat source in another part of the device. This creates a need for dynamic reassignment, recalibration, or correction of measurement data from all or a subset of temperature sensors such that they continue to accurately measure the component temperature based on device posture and relative positions of the heat sources.

Figure 1:
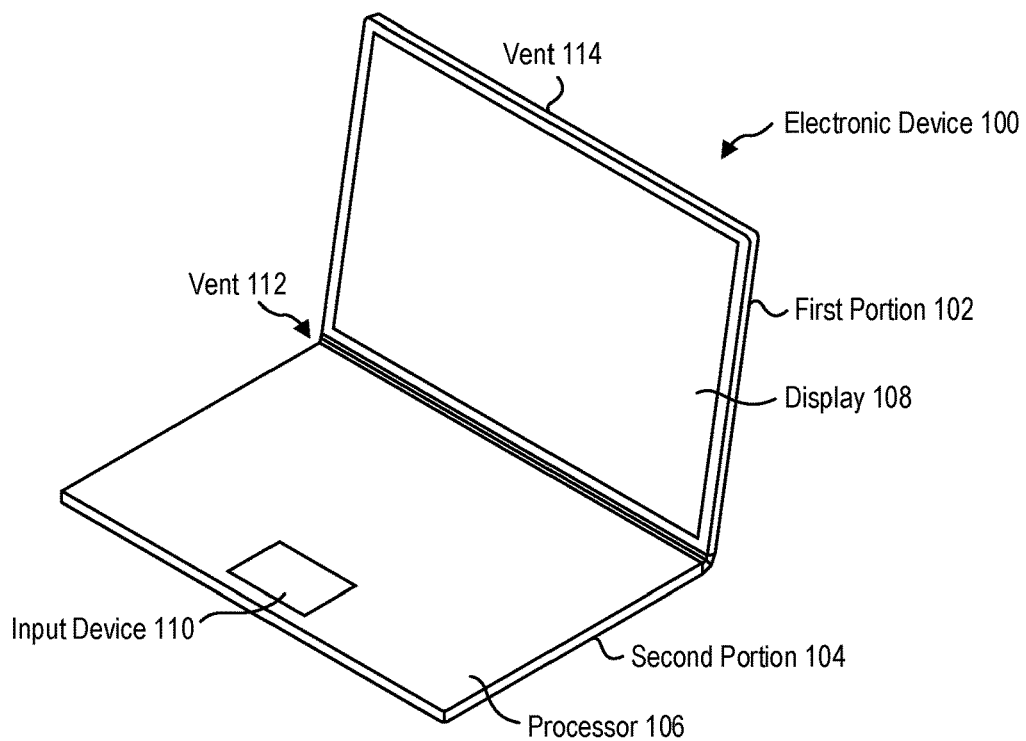
FIG. 1 is a perspective view of an electronic device with a thermal management device.

FIG. 1 is a perspective view of an electronic device 100. In some implementations, the electronic device 100 is a portable electronic device, such as a laptop, a smartphone, a tablet computer, a hybrid computer, a wearable electronic device (e.g., a head-mounted device, a smartwatch, headphones) or other portable electronic device. In some implementations, the electronic device 100 is an electronic device that is conventionally operated in a fixed location, such as a television, home theater, desktop computer, server computer, projector, optical disc player (e.g., CD player, DVD player, BLURAY player), video game console, or other electronic device.

FIG. 1 illustrates an implementation of a laptop electronic device 100. The electronic device 100 includes a first portion 102 and a second portion 104 movably connected to one another. In implementations in which the electronic device is a hybrid computer, the first portion 102 includes the display 108 and at least a processor 106. In some implementations, a processor 106 is located in the second portion 104. In some implementations, the first portion 102 of the electronic device 100 includes a display 108 to present video information to a user and the second portion 104 of the electronic device 100 includes one or more input devices 110, such as a trackpad, a keyboard, etc., to allow a user to interact with the electronic device 100. In further implementations, the first portion 102 and the second portion 104 include displays 108, one or more of which can function as an input device 110. The electronic device 100 further includes additional computer components, such as system memory, a graphical processing unit, graphics memory, speakers, one or more communication devices (such as WIFI, BLUETOOTH, near-field communications, cellular), peripheral connection points, hardware storage device(s), etc. In some implementations, the first portion 102 is removable from the second portion 104.

The electronic components of an electronic device 100, in particular the display 108, input device 110, processor 106, memory, and batteries, occupy volume, consume power and generate thermal energy. In the example illustrated in FIG. 1 and in other examples, it is desirable that the electronic devices be thin and light for transport, while remaining powerful and efficient during use. The thermal energy generated by the electronic device 100, therefore, has little unobstructed volume inside the first portion 102 and/or second portion 104 through which air can flow. In some implementations, an active thermal management device with an impeller is used to actively move air in, out, or through the first portion 102 and/or second portion 104 to exhaust warm air from vents 112, 114.

Figure 2:
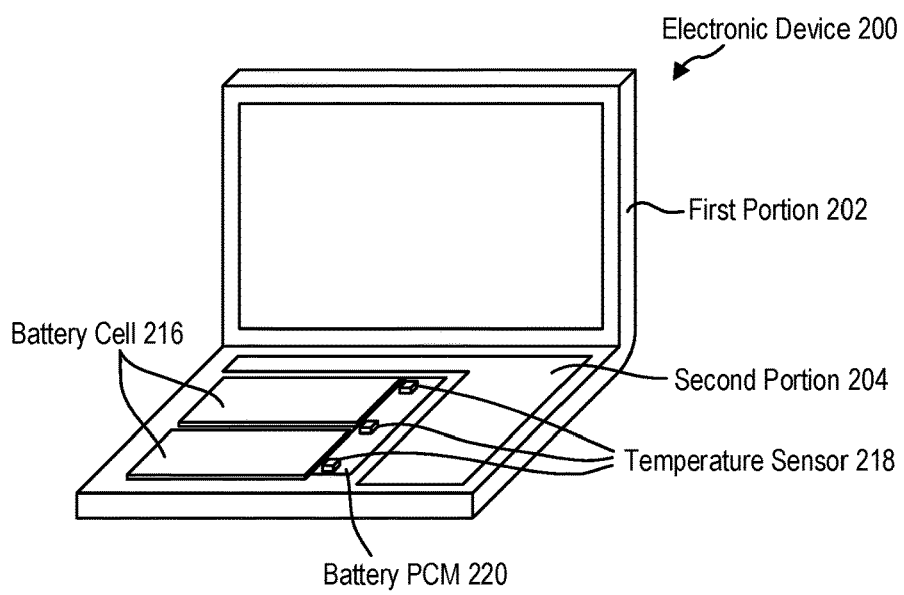
FIG. 2 is a perspective view of an electronic device with a plurality of temperature sensors.

FIG. 2 is a schematic perspective view of an electronic device 200 having a thermal management system according to the present disclosure. In some implementations, the electronic device 200 has at least one battery cell 216 located in the first portion 202 and/or second portion 204. The battery cells 216 generate heat during operation of the electronic device 200 (i.e., discharging of the battery cells 216) and/or during charging of the battery cells 216.

In some implementations, a plurality of temperature sensors 218 are positioned adjacent to and/or in contact with the battery cells 216 to monitor a temperature of the battery cells 216. In some implementations, at least one of the temperature sensors 218 is located on a battery protection circuit module (PCM) 220 that is in electrical and/or data communication with the battery cells 216 through a serial data bus. The battery PCM 220 monitors the current and/or voltage applied to or generated by the battery cells 216. The battery PCM 220 protects the battery cells, for example lithium-ion cells, from damage due to overheating, overcharging, over-discharging, over-current, or combinations thereof.

In some implementations, the battery cells 216 are damaged by charging or discharging while the battery cells 216 are at an elevated temperature. To prevent such damage, in some implementations, the battery PCM 220 determines a temperature of the battery cells 216 and adjusts the performance (operation) of the battery cells 216 depending upon the determined temperature In some implementations, adjusting the performance of the battery cells 216 includes lowering a charging current when a temperature of the battery cells 216 is outside of an outer threshold. For example, when a battery is over a safe operating temperature, the outer threshold is an upper threshold. In some examples when a battery is cold and below safe operating temperatures, the outer threshold is a lower threshold. In some implementations, adjusting the performance of the battery cells 216 includes lowering a discharging current (e.g., a draw on the battery cells 216 from the electronic components of the electronic device 200) when a temperature of the battery cells 216 is outside the outer threshold. In some examples, lowering the charge or discharge current of the battery cells 216 when outside an outer threshold reduces the risk of damage to the battery cells or associated electronics, including the battery PCM 220.

In some implementations, adjusting the performance of the battery cells 216 includes increasing a charging current when a temperature of the battery cells 216 is within the outer threshold. In some implementations, adjusting the performance of the battery cells 216 includes lowering a discharging current (e.g., a draw on the battery cells 216 from the electronic components of the electronic device 200) when a temperature of the battery cells 216 is within an outer threshold. In some examples, increasing the charge or discharge current of the battery cells 216 when within an outer threshold allows for an increase in charging rate or an increase in computational performance of the electronic device 200, respectively.

Adjusting the performance of the battery cells 216 of the electronic device 200 based on battery temperature protects the battery cells 216 and other components from damage while also providing the best experience for a user of the electronic device 200. Correct adjustment of the battery cell performance by the battery PCM 220 is dependent on accurate determinations of battery cell temperature. In some implementations, the battery PCM 220 includes one or more temperature sensors, and in some implementations, additional temperature sensors are positioned on or adjacent the battery cells 216, but other heat sources in the electronic device 200 can influence the accuracy of temperature measurements of the battery cells 216.

Figure 3:
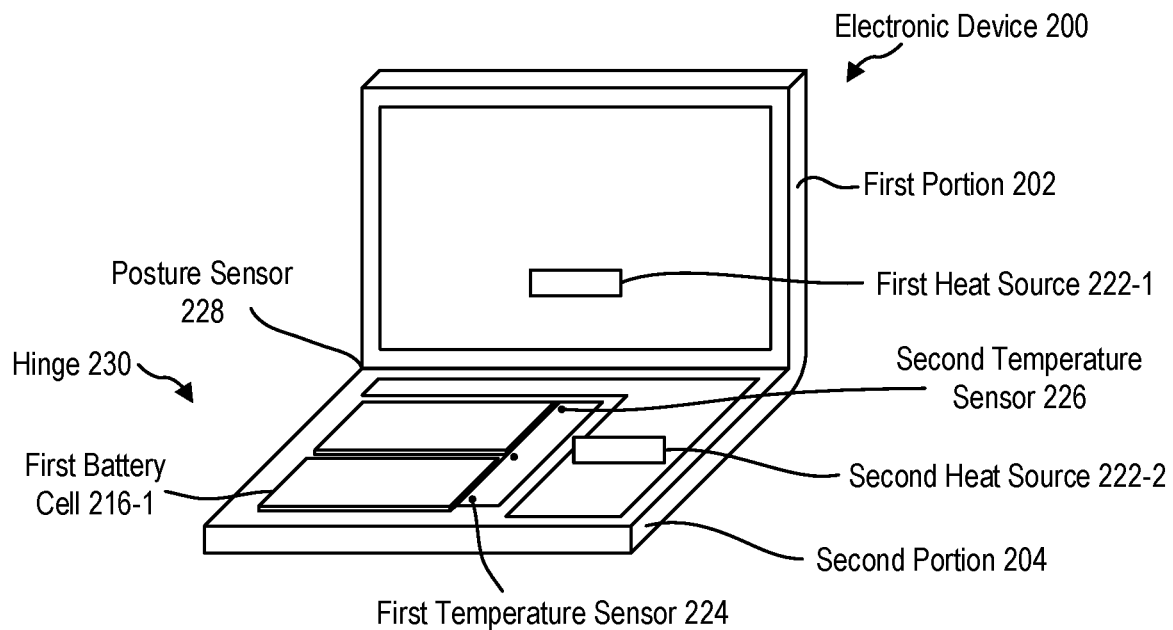
FIG. 3 is a perspective view of the electronic device of FIG. 2 in a laptop posture.

Referring now to FIG. 3, the electronic device 200 is illustrated in a laptop posture. As described in relation to FIG. 1, in some implementations, an electronic device 200 includes electronic components that generate heat during use. In some implementations, the heat sources 222-1, 222-2 are located in the first portion 202, the second portion 204, or both the first portion 202 and second portion 204. In the example illustrated in FIG. 3, a first heat source 222-1 is located in the first portion 202 and a second heat source 222-2 is located in the second portion 204 of the electronic device 200.

The first heat source 222-1 and second heat source 222-2 are both electronic components of the electronic device 200 that are not the battery. In some implementations, each battery cell of the electronic device 200 has at least one temperature sensor positioned on or adjacent to the battery cell to measure a battery cell temperature. In an example, a first battery cell 216-1 of the electronic device 200 has a first temperature sensor 224 positioned at an end of the first battery cell 216-1 to measure a first battery cell temperature. The measured temperature of the first temperature sensor 224, however, may be affected by the proximity of the first temperature sensor 224 to the first heat source 222-1 and/or the second heat source 222-2. For example, the plurality of temperature sensors described in relation to FIG. 2 can allow for temperature measurements of the battery PCM and/or battery cells. Depending on the location and/or subcomponent in the battery (e.g., the first battery cell 216-1) the temperature sensor that is used as the first temperature sensor 224 will vary.

In the example of the first battery cell 216-1, the first temperature sensor 224 is the temperature sensor closest to the first battery cell 216-1. In some implementations, two or more temperature sensors are equidistant to the first battery cell 216-1, and the first temperature sensor 224 is selected from the two or more temperature sensors. In some implementations, a plurality of temperature sensors is positioned close enough to the first battery cell 216-1 to receive at least some thermal energy from the first battery cell 216-1, and the first temperature sensor 224 is selected from the plurality of temperature sensors.

For example, depending on the posture of the electronic device 200, a first temperature sensor of the plurality of temperature sensors is closer to the first heat source 222-1 than a second temperature sensor. In some implementations, the temperature sensor furthest from the known heat sources 222-1, 222-2 is selected to be the first temperature sensor. In some implementations, the plurality of temperature sensors measures temperatures at the location of each temperature sensor, and the first temperature sensor is selected based on a calculated temperature profile.

In some implementations, the distance and angle of the heat sources 222-1, 222-2 relative to the temperature sensors affects measurements at each of the temperature sensors. The posture of the electronic device 200 is the relationship of the first portion 202 and the second portion 204 relative to one another. In some implementations, the posture of the electronic device 200 is the relationship of the first portion 202 and the second portion 204 relative to one another and the relationship of the electronic device 200 to a surface that the electronic device 200 is positioned on and/or the orientation of the electronic device 200 in space. In some examples, a "laptop configuration" of the electronic device 200, as illustrated in FIG. 3, includes the first portion 202 and second portion 204 arranged at an angle relative to one another between approximately 90° and 135°. In other examples, a "laptop configuration" of the electronic device 200, includes the first portion 202 and second portion 204 arranged at an angle relative to one another between approximately 90° and 135° and the second portion oriented horizontally relative to a direction of gravity. In at least one example, the first portion 202 and second portion 204 arranged at an angle relative to one another between approximately 90° and 135° while the second portion 204 is horizontal is a first posture and the first portion 202 and second portion 204 arranged at an angle relative to one another between approximately 90° and 135° while the second portion 204 is vertical is a second posture.

In some implementations a posture of the electronic device is measured by a posture sensor 228. In some implementations, the posture is measured by a plurality of posture sensors 228. In some examples, a posture sensor 228 is positioned in a hinge 230 of the electronic device. In some implementations, the posture sensor 228 measures the angular position of the first portion 202 relative to the second portion 204 around the hinge. The angular position of the first portion 202 relative to the second portion 204 indicates a distance and an angle of the first heat source 222-1 (or other heat sources in the first portion 202) relative to the temperature sensors.

In some implementations, the posture sensor 228 in the hinge 230 measures the orientation of the first portion 202 relative to the second portion 204 when the first portion 202 is rotatable or removable relative to the second portion 204. In some examples, such as a hybrid laptop, the first portion 202 is removable from the hinge 230 and useable as a tablet computing device. In other examples, the first portion 202 is rotatable about an axis perpendicular to the hinge 230 to turn a display to face away from the second portion 204.

In some implementations, the posture sensor 228 measures the direction the first portion 202 is facing relative to the second portion 204 and an angular position of the first portion 202 relative to the second portion. In such implementations, turning the first portion 202 around relative to the hinge 230 moves the first heat source 222-1 relative to the temperature sensors even when the first portion 202 and second portion 204 are positioned at the same angular relationship.

In some implementations, the posture sensor 228 can include a plurality of posture sensors that measure the position and/or orientation of the first portion 202 relative to the second portion 204. In some examples, the plurality of posture sensors includes infrared sensors that measure a distance between the first portion 202 and the second portion 204. Because the first portion 202 and second portion 204 are connected at the hinge 230, the distance between two known points allows the calculation of the posture and the position of the heat sources 222-1, 222-2 relative to the temperature sensors. In other examples, the plurality of posture sensors includes a plurality of magnets that measure a distance between the first portion 202 and the second portion 204.

In some implementations, the temperature sensors, including the first temperature sensor 224 and at least one second temperature sensor 226 measure a temperature profile. The temperature profile can include a plurality of temperature measurements from different locations in the electronic device 200 that allow for an adjustment or correction to be made to a measured temperature of the first battery cell 216-1.

In some implementations, an adjustment or correction can be made to a measured temperature of a battery cell by applying a percentage or other coefficient to the measured temperature. For example, the first temperature sensor 224 measures a first temperature of the first battery cell 216-1. When the electronic device 200 is in a closed position (e.g., the first portion 202 is adjacent the second portion 204 and the laptop is in a closed clamshell configuration), the first heat source 222-1 provides additional thermal energy to the first temperature sensor 224 that causes the first temperature to be higher than the actual temperature of the first battery cell 216-1. In some implementations, the first heat source 222-1 has a known temperature, such as a processor that has a thermocouple to monitor the temperature of the processor during use, and the posture of the electronic device 200 is used to correct the first measured temperature based on the proximity and temperature of the first heat source 222-1.

Figure 4:
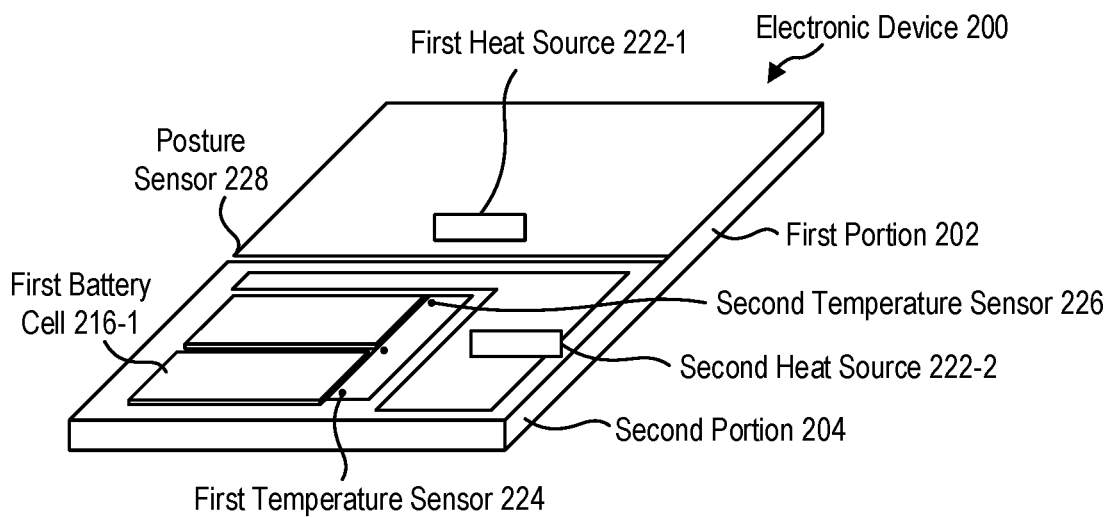
FIG. 4 is a perspective view of the electronic device of FIG. 2 in a flat posture.

FIG. 4 illustrates the electronic device 200 of FIG. 3 in a flat posture with the first portion 202 and second portion 204 in a plane with one another. When the first portion 202 and second portion 204 are in a flat posture, the first heat source 222-1 is further from the first temperature sensor 224, reducing the influence of the first heat source 222-1 on the first temperature sensor 224. Additionally, a surface of the first portion 202 is oriented to radiate thermal energy in a perpendicular direction to the second portion 204, further reducing the influence of the first heat source 222-1 on the first temperature sensor 224.

The first heat source 222-1 is further from the first temperature sensor 224 but remains comparatively close to the second temperature sensor 226. Therefore, the amount of thermal energy from the first heat source 222-1 at the first temperature sensor 224 and the amount of thermal energy from the first heat source 222-1 at the second temperature sensor 226 change by a different amount from the laptop posture of FIG. 3 to the flat posture of FIG. 4. Any correction to the first temperature measured by the first temperature sensor 224 will be different when the electronic device 200 is in the laptop posture and when the electronic device 200 is in the flat posture.

In a flat posture, therefore, the influence of the first heat source 222-1 is reduced relative to a laptop posture, while the influence of the second heat source 222-2 remains unchanged. In the illustrated implementation, the second heat source 222-2 provides approximately the same thermal energy to the second temperature sensor 226 as the first temperature sensor 224, so a difference in measurements between the second temperature sensor 226 and the first temperature sensor 224 may be attributed to heat generated by the first battery cell 216-1.

Figure 5:
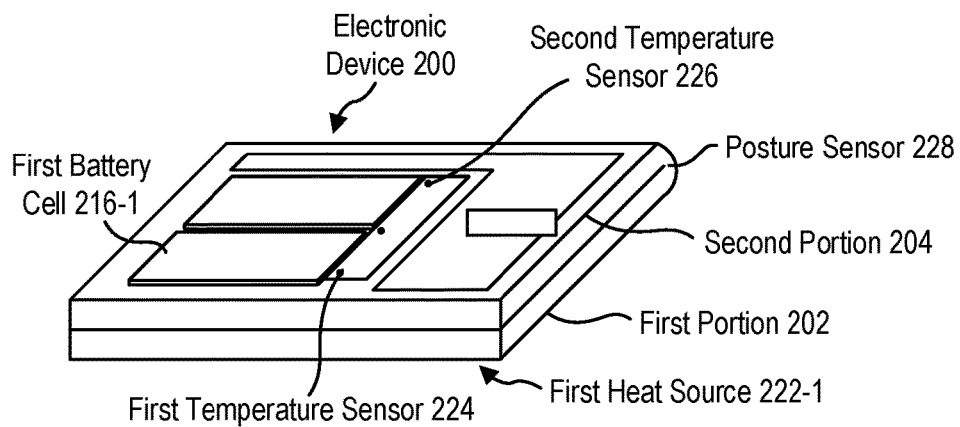
FIG. 5 is a perspective view of the electronic device of FIG. 2 in an inverted posture.

FIG. 5 illustrates the implementation of an electronic device 200 of FIGS. 3 and 4 in an inverted posture with the first portion 202 opened approximately 360° to contact a rear surface of the second portion 204. The posture sensor 228 measures the position of the first portion 202 relative to the second portion 204. The first heat source 222-1 of the first portion 202 is now adjacent to the rear surface of the second portion 204 and provides additional thermal energy to the second temperature sensor 226 and the first temperature sensor 224, further influencing the measurements of the temperature sensors. Therefore, the temperature measured by the first temperature sensor 224 proximate the first battery cell 216-1 will read higher than the actual first temperature of the first battery cell 216-1.

Figure 6:
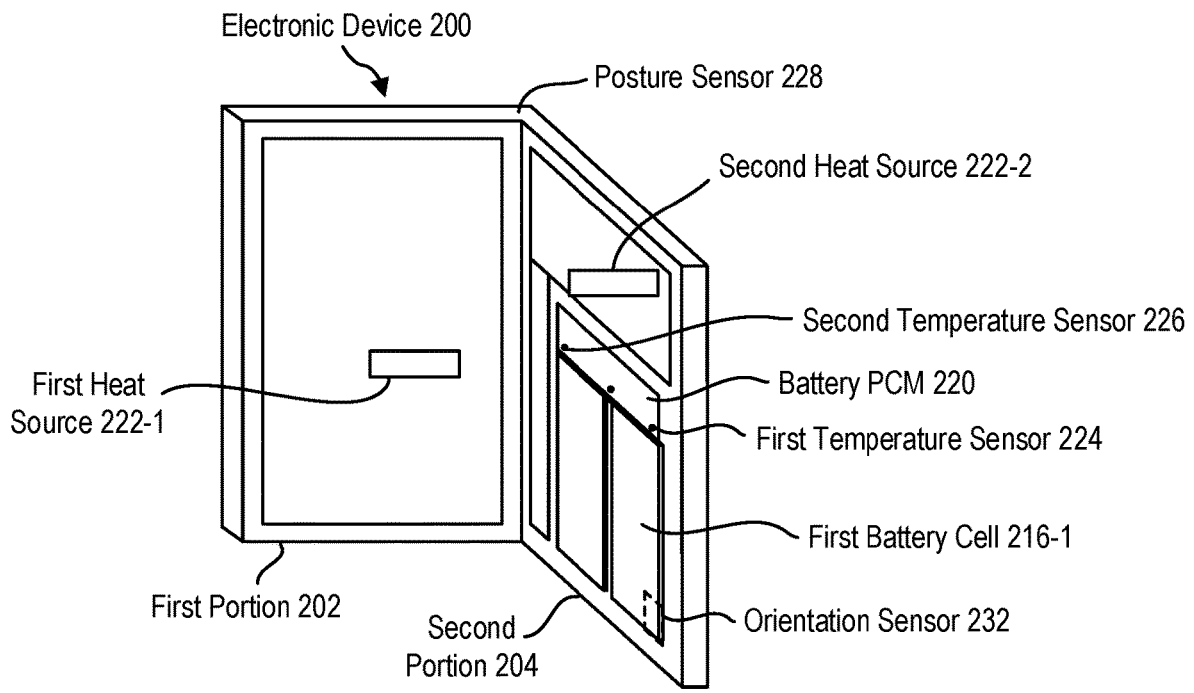
FIG. 6 is a perspective view of the electronic device of FIG. 2 in a book posture.

In some implementations, a posture includes an orientation of the electronic device 200, such as is illustrated in FIG. 6. The electronic device 200 is in a book posture. In implementations with a display in both the first portion 202 and the second portion 204, the book posture may be particularly useful. The first portion 202 and second portion 204 are positioned with an angular relationship similar to the laptop posture described in relation to FIG. 3. The angular relationship is measured by the posture sensor 228. However, the angular relationship alone, in this example, does not represent the complete posture of the device as the first portion 202 and second portion 204 are oriented vertically, which can alter thermal management characteristics of the electronic device 200.

In some implementations, an orientation sensor 232 allows measurement of an orientation of at least a portion of the electronic device 200 relative to a direction of gravity. In some examples, the orientation sensor 232 is an accelerometer. In other examples, the orientation sensor 232 is a gyroscope. In yet other examples, the orientation sensor 232 is another device able to measure a relative direction of gravity as the electronic device 200 moves.

In the implementation illustrated in FIG. 6, the orientation sensor 232 is located in or on a first battery cell 216-1. In some implementations, the orientation sensor 232 is located elsewhere in the battery. In some implementations, the orientation sensor 232 is located elsewhere in the electronic device 200 outside of the battery. While the posture sensor 228 has been described as being located elsewhere in the electronic device 200, in some implementations, the posture sensor 228 is located in or on a first battery cell 216-1. In some implementations, the posture sensor 228 is located elsewhere in the battery.

In some implementations, a posture sensor 228 and/or orientation sensor 232 positioned in the battery and/or the battery cells allows the battery PCM 220 to adjust the temperature measurements of the temperature sensors and/or adjust the performance of the battery cells without using additional system resources of the electronic device 200. For example, a battery PCM 220 with a posture sensor 228 and/or orientation sensor 232 on the PCM 220 or in direct communication with the battery PCM 220 allows the battery to operate independently of the electronic device to protect the battery cells from overcharging or over-discharging irrespective of any processing performed by the processor of the electronic device.

Figure 7:
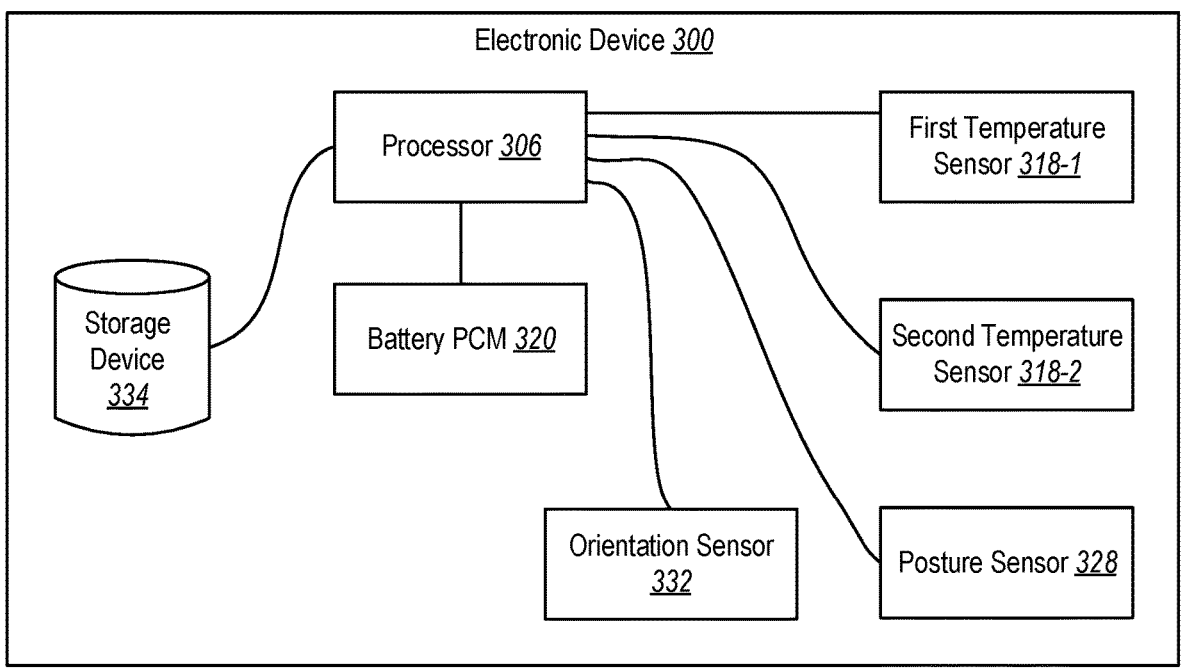
FIG. 7 is a system diagram of an electronic device with a posture sensor and temperature sensors.

Referring now to FIG. 7, in some implementations, the battery PCM 320 is in data communication with a processor 306 of the electronic device 300. The processor 306 is, in turn, in data communication with a first temperature sensor 318-1, a second temperature sensor 318-2, and a posture sensor 328, which each provide information to the processor 306 regarding the position and temperatures of the electronic device 300. In some implementations, the processor 306 is also in data communication with an orientation sensor 332 that provides information to the processor 306 regarding the orientation of the electronic device 300 relative to the direction of gravity.

In some implementations, the processor 306 is in data communication with a hardware storage device 334. The hardware storage device 334 has instructions stored thereon that, when executed by the processor 306, cause the processor 306 to execute any of the methods or parts of the methods described herein. In some implementations, the processor 306 is in data communication with a secondly located hardware storage device, such as via a network.

In some implementations, the hardware storage device 334 is a solid-state storage medium. In some examples, the hardware storage device 334 is a volatile storage medium, such as dynamic random-access memory (DRAM). In other examples, the hardware storage device 334 is a non-volatile storage medium, such as electrically erasable programmable read-only memory or flash memory (NAND- or NOR-type). In some implementations, the hardware storage device 334 is a platen-based storage medium, such as a magnetic platen-based hard disk drive. In some implementations, the hardware storage device 334 is an optical storage medium, such as a compact disc, digital video disc, BLURAY disc, or other optical storage format.

Figure 8:
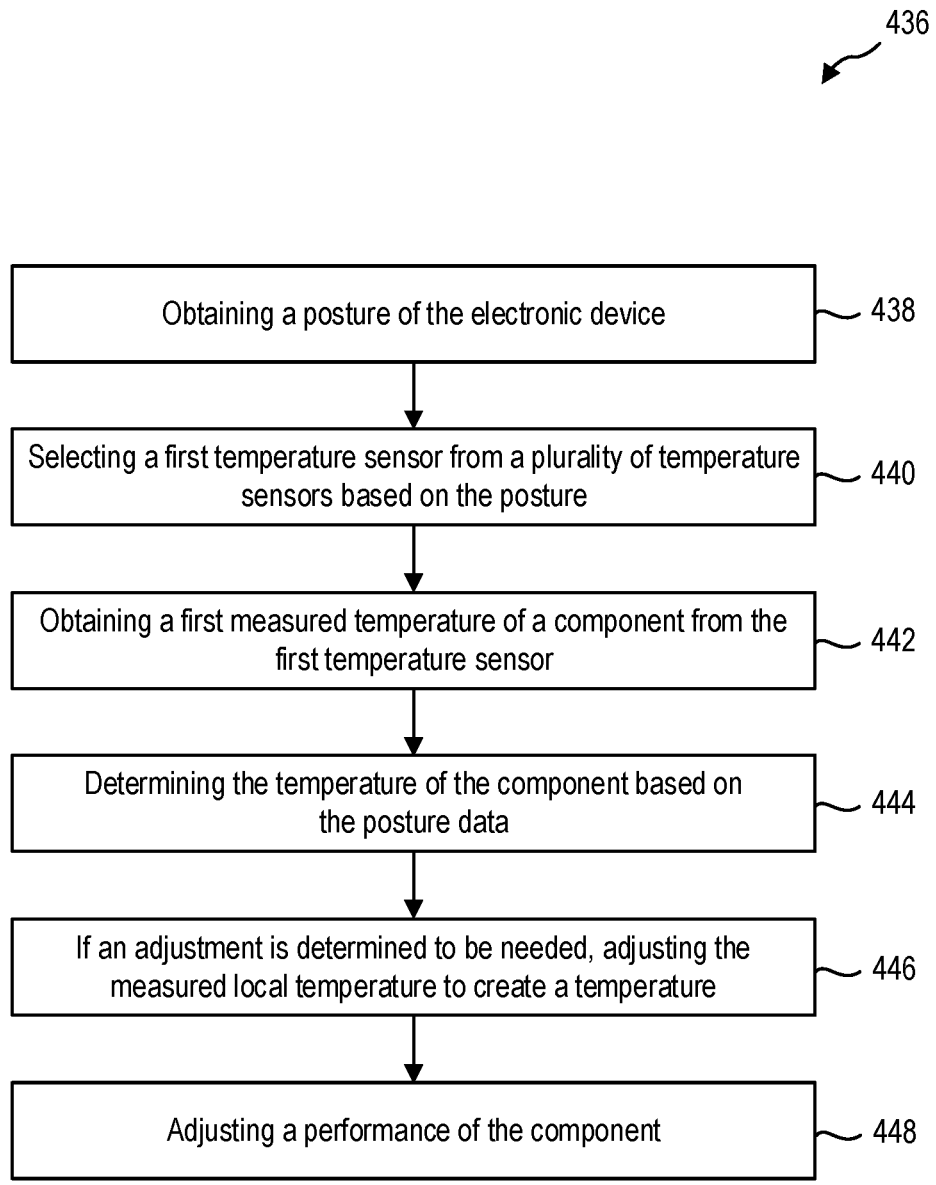
FIG. 8 is a flowchart illustrating a method of adjusting component performance including selecting a temperature sensor for a single measurement.

FIG. 8 is a flowchart illustrating an implementation of a method 436 of adjusting battery performance including selecting a first temperature sensor and obtaining a measurement from at least that sensor. In some implementations, the method 436 includes obtaining a posture of the electronic device at 438. In some implementations, the posture of the electronic device includes an angular relationship of a first portion of the electronic device to a second portion of the electronic device. In some implementations, the posture of the electronic device includes an orientation of the electronic device relative to a direction of gravity.

In some implementations, obtaining the posture of the electronic device includes measuring a posture of the electronic device using a posture sensor and/or orientation sensor. In some examples, the posture sensor is positioned in a hinge of the electronic device to measure an angular relationship of a first portion of the electronic device to a second portion of the electronic device. In other examples, the posture sensor is a plurality of sensors located in the first portion and the second portion that measure a distance between and/or relative movement of the first portion and the second portion.

In some implementations, obtaining the posture of the electronic device includes accessing posture data from a system memory or from a processor of the electronic device. In some examples, a battery PCM is in data communication with the central processing unit (CPU) of the electronic device, and the CPU provides the posture data to the battery PCM.

The method 436 further includes selecting a first temperature sensor from a plurality of temperature sensors at 440. In many electronic devices, a plurality of temperature sensors is available to provide temperature information to a processor or microcontroller. For example, the processor has a thermocouple positioned in contact with the processor core to measure an operating temperature of the processor and avoid damaging the processor. In another example, many batteries contain at least one temperature for each battery cell. In some implementations, a component has a plurality of temperature sensors adjacent to or in contact with the component to measure a first temperature thereof.

In some implementations, selecting the first temperature sensor is based upon the component to be measured. In some implementations, selecting the first temperature sensor is based at least partially upon the posture data. In some examples, a component has a first temperature sensor on an upper surface of the component and a second temperature sensor on a lower surface of the component. In a first posture, such as a conventional laptop posture, the upper surface has greater airflow to cool the first temperature sensor, and therefore the second temperature sensor represents a more conservative estimate the temperature of the component. Thus, in some implementations, while in the first posture, the second temperature sensor is used so as to err toward measuring a higher temperature and protecting the component.

In a second posture, such as an inverted posture in which the first portion of the laptop is folded 360° around the hinge and contacts a lower surface of the second portion, the lower temperature sensor is influenced by the processor and other heat-generating components of the first portion. Because of the exposure to secondary heat sources in the second posture, the upper temperature sensor is selected as the first temperature sensor in the second posture.

The method 436 includes obtaining a first measured temperature of the component with at least the first temperature sensor at 442. In some implementations, determining a first temperature includes reading a temperature measurement from the first temperature sensor and optionally applying an offset. In some implementations, determining a first temperature includes reading a plurality of temperature sensors including the first temperature sensor and aggregating the temperature measurements.

In some implementations, aggregating the temperature measurements includes averaging the temperature measurements. For example, the upper temperature sensor and the lower temperature sensor of the battery cell example described above each measure 140° F. and 150° F., respectively. In such an example, aggregating the measured temperatures provides a first measured temperature of 145° F.

In some implementations, aggregating the temperature measurements includes providing a weighted average. In some examples, the first temperature sensor provides a first temperature measurement which is averaged with a second temperature measurement from a second temperature sensor at a percentage weight. For example, the upper temperature sensor and the lower temperature sensor of the battery cell example described above each measure 120° F. and 150° F., respectively. In such an example, aggregating the first measured temperature from the first temperature sensor (the upper temperature sensor) with a 50% weighted second measured temperature (from the lower temperature sensor) provides a first measured temperature of 130° F. In some implementations, aggregating the temperature measurements includes excluding one or more temperature sensors from the aggregation, e.g., in accordance with a determination that the one or more temperature sensors are in close proximity to secondary heat source.

In some implementations, aggregating the temperature measurements includes comparing the temperature measurements and selecting a minimum or maximum value. In some implementations, it is desirable to select a maximum value, as exceeding a maximum value can damage the component. Therefore, comparing the measured temperatures and selecting a maximum value among the measured temperatures provides a conservative measurement to protect the components. For example, the upper temperature sensor and the lower temperature sensor of the battery cell example described above each measure 120° F. and 150° F., respectively. In such an example, aggregating the first measured temperature from the first temperature sensor (the upper temperature sensor) with a second measured temperature (from the lower temperature sensor) selects a maximum value and provides a first measured temperature of 150° F.

In some implementations, it is desirable to select a minimum value, as a minimum value would measure only the thermal energy of the component and a higher value would be caused by exposure to additional thermal energy from a secondary heat source. In some implementations, the thermal energy from the secondary heat source is representative of the potential damage to the component being measured. Therefore, comparing the measured temperatures and selecting a minimum value among the measured temperatures can provide a measurement of only the thermal energy generated by the component. For example, aggregating the first measured temperature from the first temperature sensor (the upper temperature sensor) with a second measured temperature (from the lower temperature sensor) selects a minimum value and provides a first measured temperature of 120° F.

The method 436 further includes determining the temperature of the component based on the posture data at 444 and, if an adjustment is determined to be needed, adjusting the first measured temperature to create a component temperature at 446. In some implementations, determining the temperature of the component based on the posture data includes comparing the posture data to a threshold value. In some examples, the effect on temperature sensors in a second portion of an electronic device by secondary heat sources in the first portion is based at least partially upon the position of the first portion relative to the second portion, such as described in relation to FIG. 3 through FIG. 6.

In some implementations, the measured temperature is adjusted to account for a distance between the component and the temperature (e.g., a distance that is dependent on a posture of the device). In some implementations, the effect of a secondary heat source in the first portion will necessitate an adjustment of the first measured temperature when the first portion is within a closed threshold (i.e., a first portion is nearing a conventional clamshell closed posture) or within an inverted threshold (i.e., the first portion is approaching the inverted posture described in relation to FIG. 5). For example, the first portion is within the closed threshold when the posture data indicates the first portion and second portion are closer than the closed threshold. In other examples, the first portion is within the inverted threshold when the posture data indicates the first portion and second portion are closer to the inverted posture than the inverted threshold.

In some implementations, a closed threshold is in a range having an upper value, a lower value, or upper and lower values including any of 5°, 10°, 15°, 20°, 30°, 40°, 45°, 50°, 60°, or any values therebetween. In some examples, the closed threshold is greater than 5°. In other examples, the closed threshold is less than 60°. In yet other examples, the closed threshold is between 5° and 60°. In yet other examples, the closed threshold is between 10° and 50°. In at least one example, the closed threshold is about 45°.

In some implementations, an inverted threshold is in a range having an upper value, a lower value, or upper and lower values including any of 300°, 310°, 315°, 320°, 330°, 340°, 350°, 355°, or any values therebetween. In some examples, the inverted threshold is greater than 300°. In other examples, the inverted threshold is less than 355°. In yet other examples, the inverted threshold is between 300° and 355°. In yet other examples, the inverted threshold is between 310° and 350°. In at least one example, the inverted threshold is about 315°.

In some implementations, adjusting the first measured temperature includes multiplying the first measured temperature by a coefficient. In some implementations, the coefficient is determined by the posture data. In some examples, the coefficient is based upon the angular relationship of the first portion and second portion relative to the closed threshold or the inverted threshold. For example, when the first portion and the second portion are oriented at 30° and the closed threshold is 60°, the posture data indicates that the first portion and second portion are positioned at 50% within the closed threshold. In another example, when the first portion and the second portion are oriented at 45° and the closed threshold is 60°, the posture data indicates that the first portion and second portion are positioned at 25% within the closed threshold. The adjustment to the first measured temperature may be greater when the first portion and the second portion are further within the closed threshold (or inverted threshold).

In some implementations, there may be a plurality of tiers within a threshold, where each of the tiers corresponds to a different coefficient. In some examples, the closed threshold is 60°, while the coefficient used to adjust the first measured temperature is based upon tiers at 45°, 30°, and 15° as the first portion approaches a closed position.

In some implementations, the method 436 further includes adjusting a performance of the component based on the corrected component temperature at 448. In some examples, the corrected component temperature is within a safe operating range and the performance of the component is unchanged. In other examples, the corrected component temperature indicates that the component is at risk of potential damage, and the component is therefore disabled, or the component's performance is slowed or reduced (e.g., until the temperature is within the safe operating range again). In yet other examples, the corrected component temperature indicates that the component is operating at a lower performance level than is necessary to protect the component (e.g., the component can generate more heat before encountering a risk of potential damage), and the component's performance is therefore increased.

In some implementations, adjusting the performance of the component includes adjusting a current, a voltage, or a workload (e.g., operating frequency) of the component. In a particular example when the component is a battery cell, adjusting the performance of the component includes altering a current with the battery PCM to charge the battery cell at a higher or lower rate. For example, the battery PCM lowers the current to lower the charging rate and decrease the thermal energy generated by the battery cell when the component temperature is outside an outer threshold. In other examples, the battery PCM increases the current to increase the charging rate and increase the thermal energy generated by the battery cell when the component temperature is within the outer threshold.

The charging rate of the battery cell is controlled by the battery PCM. In some examples, the battery PCM can increase or decrease a charging rate based on the battery cell temperature. In some implementations, the battery PCM can adjust the charging rate relative to a maximum (fast) charging rate according to the following:

Below 0° C.=No Charging
0 to 15° C.=Slow Charging
15 to 25° C.=Moderate charging
25 to 45° C.=Fast Charging 45 to 60° C.=Slow Charging Greater than 60° C.=No charging In yet other examples, the battery PCM terminates charging of the battery until the component temperature of the battery or battery cell is within a safe threshold. For example, a component temperature of the battery cell of greater than 60° C. can cause the battery PCM to terminate charging of the battery until the component temperature is below 45° C.

In some implementations, the processor adjusts the performance of a second component in response to the posture data and component temperature. In some examples, the battery cell has a temperature above an upper threshold, at least partially because a processor (CPU, GPU, etc.) or other heat source is generating thermal energy. Reducing an operating current or frequency of the processor (CPU, GPU, etc.), memory, display, or other heat-generating components can reduce the exposure of the battery cell to the additional thermal energy of the secondary heat source. In at least one example, the battery PCM can determine the amount of power available at the given battery cell component temperature and provide that power availability information to the processor or other microcontroller of the electronic device. The overall performance of the electronic device can be adjusted based on the power availability information.

Figure 9:
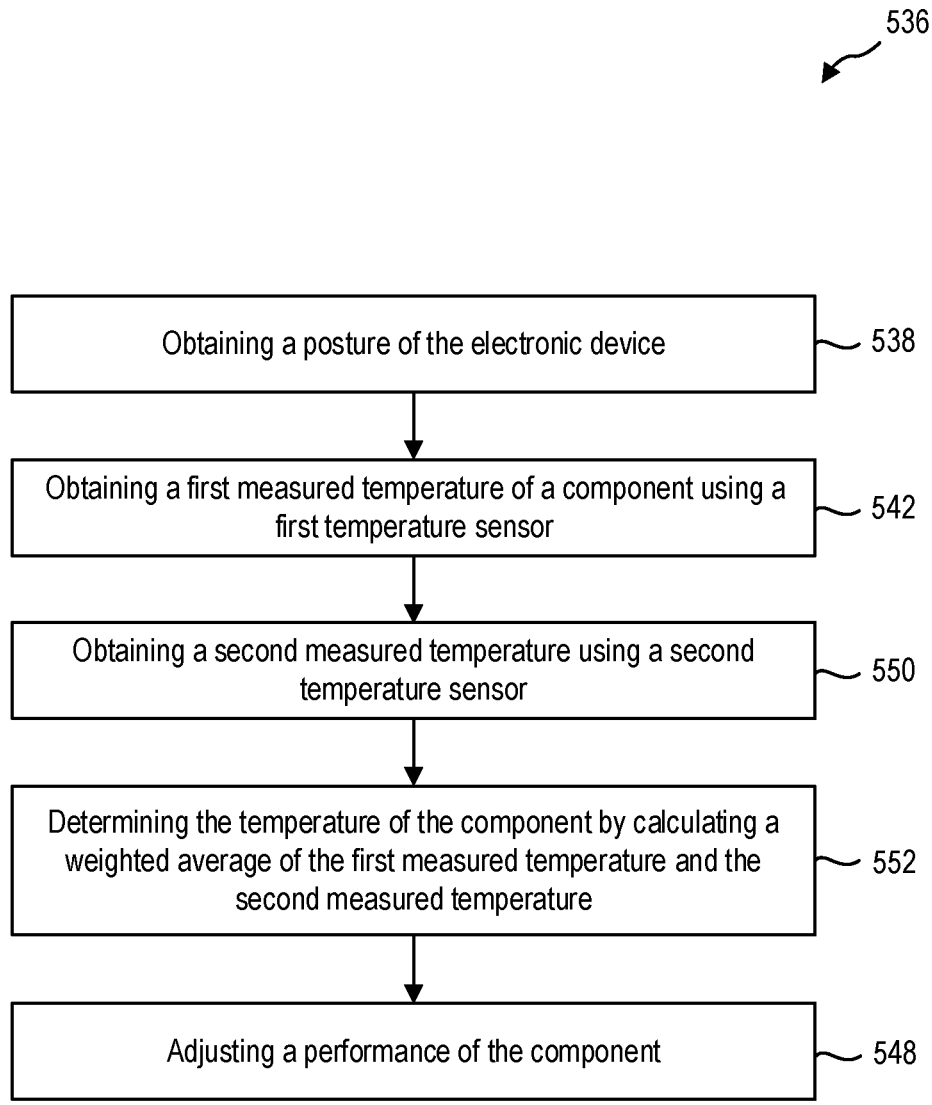
FIG. 9 is a flowchart illustrating a method of adjusting component performance including determining a component temperature by applying a correction factor to at least one temperature measurement.

FIG. 9 is a flowchart illustrating an implementation of a method 536 of adjusting battery performance including determining a battery cell temperature by applying a weighted average to at least one temperature measurement. In some implementations, the method 536 includes obtaining a posture of the electronic device at 538 similarly to as described in relation to FIG. 8.

The method 536 further includes obtaining a first measured temperature of a component using a first temperature sensor at 542. In some implementations, obtaining the first measured temperature is similarly to as described in relation to FIG. 8. In some examples, obtaining the first measured temperature includes selecting a first temperature sensor. In other examples, obtaining the first measured temperature includes obtaining a temperature with a single temperature sensor. In yet other examples, obtaining the first measured temperature includes aggregating a plurality of temperature measurements, as described in relation to FIG. 8.

The method 536, in some implementations, includes obtaining a second measured temperature of a secondary heat source in the electronic device using a second temperature sensor at 550. In some examples, obtaining the second measured temperature includes selecting a second temperature sensor. In other examples, obtaining the second measured temperature includes obtaining a temperature with a single temperature sensor. In yet other examples, obtaining the second measured temperature includes aggregating a plurality of temperature measurements, such as described in relation to FIG. 8.

The method 536 further includes determining the temperature of the component by calculating a weighted average of the first measured temperature and the second measured temperature at 552. In some examples, the first temperature sensor provides the first measured temperature which is averaged with the second measured temperature from a second temperature sensor at a percentage weight. For example, the upper temperature sensor and the lower temperature sensor of the battery cell example described above each measure 120° F. and 150° F., respectively. In such an example, aggregating the first measured temperature from the first temperature sensor (the upper temperature sensor) with a 50% weighted second measured temperature (from the lower temperature sensor) provides a first measured temperature of 130° F. In some implementations, aggregating the temperature measurements includes excluding one or more temperature sensors from the aggregation, e.g., in accordance with a determination that the one or more temperature sensors are in close proximity to secondary heat source.

In some implementations, the weighting of the second measured temperature is based upon a position of the secondary heat source and/or the second temperature sensor relative to the first temperature sensor. In some implementations, the weighting of the second measured temperature is based upon the posture data.

In some examples, determining the temperature of the component by calculating a weighted average includes adjusting the first measured temperature based on the second measured temperature and the position of the secondary heat source according to the posture data. In some implementations, adjusting the first measured temperature includes comparing the first measured temperature to a lookup table and correlating the first measured temperature to a component temperature based on the second measured temperature. For example, a first measured temperature of 140° F. may correlate to a component temperature of 120° F. when the second measured temperature of the secondary heat source is 160° F.

In some examples, the lookup table includes posture data. For example, a first measured temperature of 140° F. when the electronic device is in an inverted posture and the secondary heat source has a second measured temperature of 140° F. may correlate to a 120° F. component temperature.

After determining the component temperature, the component temperature can be optionally used to adjust a performance of the component at 548, similarly to as described in relation to FIG. 8. In some implementations, the method 536 includes adjusting the performance of a second component in response to the posture data and component temperature. In at least one implementation, the second component is the secondary heat source.

In some examples, the battery cell has a temperature above an upper threshold, at least partially because a processor (CPU, GPU, etc.) or other heat source is generating thermal energy. Reducing an operating current or frequency of the processor (CPU, GPU, etc.), memory, display, or other heat-generating components can reduce the exposure of the battery cell to the additional thermal energy of the secondary heat source. In at least one example, the battery PCM can determine the amount of power available at the given battery cell component temperature and provide that power availability information to the processor or other microcontroller of the electronic device. The overall performance of the electronic device can be adjusted based on the power availability information.

INDUSTRIAL APPLICABILITY

This disclosure generally relates to systems and methods of adjusting a measured temperature of a component in an electronic device where heat sources in the electronic device are movable relative to one another. For example, an electronic device with a first portion that is foldable or rotatable relative to a second portion can have a temperature sensor in the second portion that is affected by a heat-generating component in the first portion. When the temperature sensor in the second portion attempts to measure a temperature of component in the second portion, the heat-generating component in the first portion can influence the temperature measurement.

In some implementations, the electronic device is a portable electronic device, such as a laptop, a smartphone, a tablet computer, a hybrid computer, a wearable electronic device (e.g., a head-mounted device, a smartwatch, headphones) or other portable electronic device. In some implementations, the electronic device is an electronic device that is conventionally operated in a fixed location, such as a television, home theater, desktop computer, server computer, projector, optical disc player (e.g., CD player, DVD player, BLURAY player), video game console, or other electronic device.

In some implementations, the electronic device includes a first portion and a second portion movably connected to one another. In implementations in which the electronic device is a hybrid computer, the first portion includes the display and at least a processor. In some implementations, a processor is located in the second portion. In some implementations, the first portion of the electronic device includes a display to present video information to a user and the second portion of the electronic device includes one or more input devices, such as a trackpad, a keyboard, etc., to allow a user to interact with the electronic device. The electronic device further includes additional computer components, such as system memory, a graphical processing unit, graphics memory, speakers, one or more communication devices, (such as WIFI, BLUETOOTH, near-field communications, cellular), peripheral connection points, hardware storage device(s), etc. In some implementations, the first portion is removable from the second portion.

The electronic components of an electronic device, in particular the display, input device, processor, memory, and batteries, occupy volume, consume power, and generate thermal energy. In some examples, it is desirable that the electronic devices be thin and light for transport, while remaining powerful and efficient during use. The thermal energy generated by the electronic device, therefore, has little unobstructed volume inside the first portion and/or second portion through which air can flow. In some implementations, an active thermal management device with an impeller is used to actively move air in, out, or through the first portion and/or second portion to exhaust warm air from vents.

In some implementations, the electronic device has at least one battery cell located in the first portion and/or second portion. The battery cells generate heat during operation of the electronic device (i.e., discharging of the battery cells) and/or during charging of the battery cells.

In some implementations, a plurality of temperature sensors is positioned adjacent to and/or in contact with the battery cells to monitor a temperature of the battery cells. In some implementations, at least one of the temperature sensors is located on a battery protection circuit module (PCM) that is in electrical and/or data communication with the battery cells. The battery PCM monitors the current and/or voltage applied to or generated by the battery cells. The battery PCM protects the battery cells, for example lithium-ion cells, from damage due to overcharging, overdischarging, over-drain, or combinations thereof.

In some implementations, the battery cells are damaged by charging or discharging while the battery cells are at an elevated temperature. The battery PCM can adjust the performance of the battery cells depending upon the temperature of the battery cells.

In some implementations, adjusting the performance of the battery cells includes lowering a charging current when a temperature of the battery cells is outside an outer threshold. In some implementations, adjusting the performance of the battery cells includes lowering a discharging current (e.g., a draw on the battery cells from the electronic components of the electronic device) when a temperature of the battery cells is outside an outer threshold. In some examples, lowering the charge or discharge current of the battery cells when above an upper threshold reduces the risk of further increases in temperature, which can lead to damage to the battery cells or associated electronics, including the battery PCM.

In some implementations, adjusting the performance of the battery cells includes increasing a charging current when a temperature of the battery cells is within a safe threshold. In some implementations, adjusting the performance of the battery cells includes lowering a discharging current (e.g., a draw on the battery cells from the electronic components of the electronic device) when a temperature of the battery cells is below a lower threshold. In some examples, increasing the charge or discharge current of the battery cells when within a safe threshold allows for an increase in charging rate or an increase in computational performance of the electronic device, respectively.

Adjusting the performance of the battery cells of the electronic device based on battery temperature protects the battery cells and other components from damage while also providing the best experience for a user of the electronic device. Correct adjustment of the battery cell performance by the battery PCM is related to accurate measurements of battery cell temperature. In some implementations, the battery PCM includes one or more temperature sensors, and in some implementations, additional temperature sensors are positioned on or adjacent the battery cells, but other heat sources in the electronic device can influence the accuracy of temperature measurements of the battery cells.

In some implementations, an electronic device includes electronic components that generate heat during use. In some implementations, the heat sources are located in the first portion, the second portion, or both the first portion and second portion. In some examples, a first heat source is located in the first portion and a second heat source is located in the second portion of the electronic device.

The first heat source and second heat source are both electronic components of the electronic device that are not the battery. In some implementations, each battery cell of the electronic device has at least one temperature sensor positioned on or adjacent to the battery cell to measure a battery cell temperature. In an example, a first battery cell of the electronic device has a first temperature sensor positioned at an end of the first battery cell to measure a first battery cell temperature. The measured temperature of the first temperature sensor, however, may be affected by the proximity of the first temperature sensor to the first heat source and/or the second heat source. For example, a plurality of temperature sensors can allow for temperature measurements of the battery PCM and/or battery cells. Depending on the location and/or subcomponent in the battery (e.g., the first battery cell) the temperature sensor that is used as the first temperature sensor will vary.

In the example of the first battery cell, the first temperature sensor is the temperature sensor closest to the first battery cell. In some implementations, two or more temperature sensors are equidistant to the first battery cell, and the first temperature sensor is selected from the two or more temperature sensors. In some implementations, a plurality of temperature sensors is positioned close enough to the first battery cell to receive at least some thermal energy from the first battery cell, and the first temperature sensor is selected from the plurality of temperature sensors.

For example, depending on the posture of the electronic device, a first temperature sensor of the plurality of temperature sensors is closer to the first heat source than a second temperature sensor. In some implementations, the temperature sensor furthest from the known heat sources is selected to be the first temperature sensor. In some implementations, the plurality of temperature sensors measures temperatures at the location of each temperature sensor, and the first temperature sensor is selected based on a calculated temperature profile.

In some implementations, the distance and angle of the heat sources relative to the temperature sensors affects measurements at each of the temperature sensors. The posture of the electronic device is the relationship of the first portion and the second portion relative to one another. In some implementations, the posture of the electronic device is the relationship of the first portion and the second portion relative to one another and in relation to a surface the electronic device is positioned on and/or the orientation of the electronic device in space. In some examples, a "laptop configuration" of the electronic device includes the first portion and second portion arranged at an angle relative to one another between approximately 90° and 135°. In other examples, a "laptop configuration" of the electronic device includes the first portion and second portion arranged at an angle relative to one another between approximately 90° and 135° and the second portion oriented horizontally relative to a direction of gravity. In at least one example, the first portion and second portion arranged at an angle relative to one another between approximately 90° and 135° while the second portion is horizontal is a first posture and the first portion and second portion arranged at an angle relative to one another between approximately 90° and 135° while the second portion is vertical is a second posture.

In some implementations, a posture of the electronic device is measured by a posture sensor. In some implementations, the posture is measured by a plurality of posture sensors. In some examples, a posture sensor is positioned in a hinge of the electronic device. In some implementations, the posture sensor measures the angular position of the first portion relative to the second portion around the hinge. The angular position of the first portion relative to the second portion indicates a distance and an angle of the first heat source (or other heat sources in the first portion) relative to the temperature sensors.

In some implementations, the posture sensor in the hinge measures the orientation of the first portion relative to the second portion when the first portion is rotatable or removable relative to the second portion. In some examples, such as a hybrid laptop, the first portion is removable from the hinge and useable as a table computing device. In other examples, the first portion is rotatable about an axis perpendicular to the hinge to turn a display to face away from the second portion.

In some implementations, the posture sensor measures the direction the first portion is facing relative to the second portion and an angular position of the first portion relative to the second portion. In such implementations, turning the first portion around relative to the hinge moves the first heat source relative to the temperature sensors even when the first portion and second portion are positioned at the same angular relationship.

In some implementations, the posture sensor can include a plurality of posture sensors that measure the position and/or orientation of the first portion relative to the second portion. In some examples, the plurality of posture sensors includes infrared sensors that measure a distance between the first portion and the second portion. Because the first portion and second portion are connected at the hinge, the distance between two known points allows the calculation of the posture and the position of the heat sources relative to the temperature sensors. In other examples, the plurality of posture sensors includes a plurality of magnets that measure a distance between the first portion and the second portion.

In some implementations, the temperature sensors, including the first temperature sensor and at least one second temperature sensor, measure a temperature profile. The temperature profile can include a plurality of temperature measurements from different locations in the electronic device that allow for an adjustment or correction to be made to a measured temperature of the first battery cell.

In some implementations, an adjustment or correction can be made to a measured temperature of a battery cell by applying a percentage or other coefficient to the measured temperature. For example, the first temperature sensor measures a first temperature of the first battery cell. When the electronic device is in a closed position (e.g., the first portion is adjacent the second portion and the laptop is in a closed clamshell configuration), the first heat source provides additional thermal energy to the first temperature sensor that causes the first temperature to be higher than the actual temperature of the first battery cell. In some implementations, the first heat source has a known temperature, such as a processor that has a thermocouple to monitor the temperature of the processor during use, and the posture of the electronic device is used to correct the first measured temperature based on the proximity and temperature of the first heat source.

In some implementations, the electronic device is in a flat posture with the first portion and second portion in a plane with one another. When the first portion and second portion are in a flat posture, the first heat source is further from the first temperature sensor, reducing the influence of the first heat source on the first temperature sensor. Additionally, a surface of the first portion is oriented to radiate thermal energy in a perpendicular direction to the second portion, further reducing the influence of the first heat source on the first temperature sensor.

The first heat source is further from the first temperature sensor but remains comparatively close to the second temperature sensor. Therefore, the amount of thermal energy from the first heat source at the first temperature sensor and the amount of thermal energy from the first heat source at the second temperature sensor change by a different amount from the laptop posture to the flat posture. Any correction to the first temperature measured by the first temperature sensor will be different when the electronic device is in the laptop posture and when the electronic device is in the flat posture.

In a flat posture, therefore, the influence of the first heat source is reduced relative to a laptop posture, while the influence of the second heat source remains unchanged. In the illustrated implementation, the second heat source provides approximately the same thermal energy to the second temperature sensor as the first temperature sensor, so a difference in measurements between the second temperature sensor and the first temperature sensor may be attributed to heat generated by the first battery cell.

In some implementations, an electronic device is in an inverted posture with the first portion opened approximately 360° to contact a rear surface of the second portion. The posture sensor measures the position of the first portion relative to the second portion. The first heat source of the first portion is now adjacent to the rear surface of the second portion and provides additional thermal energy to the second temperature sensor and the first temperature sensor, further influencing the measurements of the temperature sensors. Therefore, the temperature measured by the first temperature sensor proximate the first battery cell will read higher than the actual first temperature of the first battery cell.

In some implementations, a posture includes an orientation of the electronic device. For example, the electronic device is in a book posture. The first portion and second portion are positioned with an angular relationship similar to the laptop posture. The angular relationship is measured by the posture sensor. However, the angular relationship alone does not represent the complete posture of the device as the first portion and second portion are oriented vertically in the book posture, which can alter thermal management characteristics of the electronic device.

In some implementations, an orientation sensor allows measurement of an orientation of at least a portion of the electronic device relative to a direction of gravity. In some examples, the orientation sensor is an accelerometer. In other examples, the orientation sensor is a gyroscope. In yet other examples, the orientation sensor is another device able to measure a relative direction of gravity as the electronic device moves.

In some implementations, the orientation sensor is located in or on a first battery cell. In some implementations, the orientation sensor is located elsewhere in the battery. In some implementations, the orientation sensor is located elsewhere in the electronic device outside of the battery. While the posture sensor has been described as being located elsewhere in the electronic device, in some implementations, the posture sensor is located in or on a first battery cell. In some implementations, the posture sensor is located elsewhere in the battery.

In some implementations, a posture sensor and/or orientation sensor positioned in the battery and/or the battery cells allows the battery PCM to adjust the temperature measurements of the temperature sensors and/or adjust the performance of the battery cells without using additional system resources of the electronic device. For example, a battery PCM with a posture sensor and/or orientation sensor on the PCM or in direct communication with the battery PCM allows the battery to operate independently of the electronic device to protect the battery cells from overcharging or over-discharging irrespective of any processing performed by the processor of the electronic device.

In some implementations, the battery PCM is in data communication with a processor of the electronic device. The processor is, in turn, in data communication with a first temperature sensor, a second temperature sensor, and a posture sensor, which each provide information to the processor regarding the position and temperatures of the electronic device. In some implementations, the processor is also in data communication with an orientation sensor that provides information to the processor regarding the orientation of the electronic device relative to the direction of gravity.

In some implementations, the processor is in data communication with a hardware storage device. The hardware storage device has instructions stored thereon that, when executed by the processor, cause the processor to execute any of the methods or parts of the methods described herein.

In some implementations, the processor is in data communication with a secondly located hardware storage device, such as via a network.

In some implementations, the hardware storage device is a solid-state storage medium. In some examples, the hardware storage device is a volatile storage medium, such as dynamic random-access memory (DRAM). In other examples, the hardware storage device is a non-volatile storage medium, such as electrically erasable programmable read-only memory or flash memory (NAND- or NOR-type). In some implementations, the hardware storage device is a platen-based storage medium, such as a magnetic platen-based hard disk drive. In some implementations, the hardware storage device is an optical storage medium, such as a compact disc, digital video disc, BLURAY disc, or other optical storage format.

In some implementations, a method of adjusting battery performance includes selecting a first temperature sensor and obtaining a measurement from at least that sensor. In some implementations, the method includes obtaining a posture of the electronic device. In some implementations, the posture of the electronic device includes an angular relationship of a first portion of the electronic device to a second portion of the electronic device. In some implementations, the posture of the electronic device includes an orientation of the electronic device relative to a direction of gravity.

In some implementations, obtaining the posture of the electronic device includes measuring a posture of the electronic device using a posture sensor and/or orientation sensor. In some examples, the posture sensor is positioned in a hinge of the electronic device to measure an angular relationship of a first portion of the electronic device to a second portion of the electronic device. In other examples, the posture sensor is a plurality of sensors located in the first portion and the second portion that measure a distance between and/or relative movement of the first portion and the second portion.

In some implementations, obtaining the posture of the electronic device includes accessing posture data from a system memory or from a processor of the electronic device. In some examples, a battery PCM is in data communication with the central processing unit (CPU) of the electronic device, and the CPU provides the posture data to the battery PCM.

The method further includes selecting a first temperature sensor from a plurality of temperature sensors. In many electronic devices, a plurality of temperature sensors is available to provide temperature information to a processor or microcontroller. For example, the processor has a thermocouple positioned in contact with the processor core to measure an operating temperature of the processor and avoid damaging the processor. In another example, many batteries contain at least one temperature for each battery cell. In some implementations, a component has a plurality of temperature sensors adjacent to or in contact with the component to measure a first temperature thereof.

In some implementations, selecting the first temperature sensor is based at least partially upon the component to be measured. In some implementations, selecting the first temperature sensor is based at least partially upon the posture data. In some examples, a component has a first temperature sensor on an upper surface of the component and a second temperature sensor on a lower surface of the component. In a first posture, such as a conventional laptop posture, the upper surface has greater airflow and the lower temperature sensor is more representative of the upper limit of the temperature of the component. In the first posture, the lower temperature sensor is used to err toward measuring a higher temperature and protecting the component.

In a second posture, such as an inverted posture in which the first portion of the laptop is folded 360° around the hinge and contacts a lower surface of the second portion, the lower temperature sensor is influenced by the processor and other heat-generating components of the first portion. Because of the exposure to secondary heat sources in the second posture, the upper temperature sensor is selected as the first temperature sensor in the second posture.

The method includes obtaining a first measured temperature of the component with at least the first temperature sensor. In some implementations, obtaining a first measured temperature includes reading a temperature measurement from the first temperature sensor. In some implementations, obtaining the first measured temperature includes reading a plurality of temperature sensors including the first temperature sensor and aggregating the temperature measurements.

In some implementations, aggregating the temperature measurements includes averaging the temperature measurements. For example, the upper temperature sensor and the lower temperature sensor of the battery cell example described above each measure 140° F. and 150° F., respectively. In such an example, aggregating the measured temperatures provides a first measured temperature of 145° F.

In some implementations, aggregating the temperature measurements includes providing a weighted average. In some examples, the first temperature sensor provides a first temperature measurement which is averaged with a second temperature measurement from a second temperature sensor at a percentage weight. For example, the upper temperature sensor and the lower temperature sensor of the battery cell example described above each measure 120° F. and 150° F., respectively. In such an example, aggregating the first measured temperature from the first temperature sensor (the upper temperature sensor) with a 50% weighted second measured temperature (from the lower temperature sensor) provides a first measured temperature of 130° F.

In some implementations, aggregating the temperature measurements includes comparing the temperature measurements and selecting a minimum or maximum value. In some implementations, it is desirable to select a maximum value, as exceeding a maximum value can damage the component. Therefore, comparing the measured temperatures and selecting a maximum value among the measured temperatures provides a conservative measurement to protect the components. For example, the upper temperature sensor and the lower temperature sensor of the battery cell example described above each measure 120° F. and 150° F., respectively. In such an example, aggregating the first measured temperature from the first temperature sensor (the upper temperature sensor) with a second measured temperature (from the lower temperature sensor) selects a maximum value and provides a first measured temperature of 150° F.

In some implementations, it is desirable to select a minimum value, as a minimum value would measure only the thermal energy of the component and a higher value would be caused by exposure to additional thermal energy from a secondary heat source. In some implementations, the thermal energy from the secondary heat source is representative of the potential damage to the component being measured. Therefore, comparing the measured temperatures and selecting a minimum value among the measured temperatures can provide a measurement of only the thermal energy generated by the component. For example, aggregating the first measured temperature from the first temperature sensor (the upper temperature sensor) with a second measured temperature (from the lower temperature sensor) selects a minimum value and provides a first measured temperature of 120° F.

The method further includes determining whether to adjust the measured temperature based on the posture data and, if an adjustment is determined to be needed, adjusting the measured temperature to create a component temperature. In some implementations, determining whether to adjust the measured temperature based on the posture data includes comparing the posture data to a threshold value. In some examples, the effect on temperature sensors in a second portion of an electronic device by secondary heat sources in the first portion is based at least partially upon the position of the first portion relative to the second portion.

In some implementations, the effect of a secondary heat source in the first portion will necessitate an adjustment of the first measured temperature when the first portion is within a closed threshold (i.e., a first portion is nearing a conventional clamshell closed posture) or within an inverted threshold (i.e., the first portion is approaching the inverted posture). For example, the first portion is within the closed threshold when the posture data indicates the first portion and second portion are closer than the closed threshold. In other examples, the first portion is within the inverted threshold when the posture data indicates the first portion and second portion are closer to the inverted posture than the inverted threshold.

In some implementations, a closed threshold is in a range having an upper value, a lower value, or upper and lower values including any of 5°, 10°, 15°, 20°, 30°, 40°, 45°, 50°, 60°, or any values therebetween. In some examples, the closed threshold is greater than 5°. In other examples, the closed threshold is less than 60°. In yet other examples, the closed threshold is between 5° and 60°. In yet other examples, the closed threshold is between 10° and 50°. In at least one example, the closed threshold is about 45°.

In some implementations, an inverted threshold is in a range having an upper value, a lower value, or upper and lower values including any of 300°, 310°, 315°, 320°, 330°, 340°, 350°, 355°, or any values therebetween. In some examples, the inverted threshold is greater than 300°. In other examples, the inverted threshold is less than 355°. In yet other examples, the inverted threshold is between 300° and 355°. In yet other examples, the inverted threshold is between 310° and 350°. In at least one example, the inverted threshold is about 315°.

In some implementations, adjusting the first measured temperature includes multiplying the first measured temperature by a coefficient. In some implementations, the coefficient is determined by the posture data. In some examples, the coefficient is based upon the angular relationship of the first portion and second portion relative to the closed threshold or the inverted threshold. For example, when the first portion and the second portion are oriented at 30° and the closed threshold is 60°, the posture data indicates that the first portion and second portion are positioned at 50% within the closed threshold. In another example, when the first portion and the second portion are oriented at 45° and the closed threshold is 60°, the posture data indicates that the first portion and second portion are positioned at 25% within the closed threshold. The adjustment to the first measured temperature may be greater when the first portion and the second portion are further within the closed threshold (or inverted threshold).

In some implementations, there may be a plurality of tiers within a threshold, where each of the tiers corresponds to a different coefficient. In some examples, the closed threshold is 60°, while the coefficient used to adjust the first measured temperature is based upon tiers at 45°, 30°, and 15° as the first portion approaches a closed position.

In some implementations, the method further includes optionally adjusting a performance of the component based on the corrected component temperature. In some examples, the corrected component temperature is within a safe operating range. In other examples, the corrected component temperature indicates that the component is at risk of potential damage. In yet other examples, the corrected component temperature indicates that the component is operating at a lower performance level than is necessary to protect the component (e.g., the component can generate more heat before encountering a risk of potential damage.)

In some implementations, adjusting the performance of the component includes adjusting a current, a voltage, or a frequency of the component. In a particular example when the component is a battery cell, adjusting the performance of the component includes altering a current with the battery PCM to charge the battery cell at a higher or lower rate. For example, the battery PCM lowers the current to lower the charging rate and decrease the thermal energy generated by the battery cell when the component temperature is above an upper threshold. In other examples, the battery PCM increases the current to increase the charging rate and increase the thermal energy generated by the battery cell when the component temperature is below a lower threshold.

In yet other examples, the battery PCM terminates charging of the battery until the component temperature of the battery or battery cell is below a safe threshold.

In some implementations, the processor adjusts the performance of a second component in response to the posture data and component temperature. In some examples, the battery cell has a temperature above an upper threshold, at least partially because a processor (CPU, GPU, etc.) or other heat source is generating thermal energy. Reducing an operating current or frequency of the processor (CPU, GPU, etc.), memory, display, or other heat-generating components can reduce the exposure of the battery cell to the additional thermal energy of the secondary heat source. In at least one example, the battery PCM can determine the amount of power available at the given battery cell component temperature and provide that power availability information to the processor or other microcontroller of the electronic device. The overall performance of the electronic device can be adjusted based on the power availability information.

In some implementations, a method of adjusting battery performance includes determining a battery cell temperature by applying a correction factor to at least one temperature measurement. In some implementations, the method includes obtaining a posture of the electronic device similarly to as described herein.

The method further includes measuring a first measured temperature of a component using a first temperature sensor. In some implementations, measuring the first measured temperature is similarly to as described herein. In some examples, measuring the first measured temperature includes selecting a first temperature sensor. In other examples, measuring the first measured temperature includes measuring a temperature with a single temperature sensor. In yet other examples, measuring the first measured temperature includes aggregating a plurality of temperature measurements, as described herein.

The method, in some implementations, includes measuring a second measured temperature of a secondary heat source in the electronic device using a second temperature sensor. In some examples, measuring the second measured temperature includes selecting a second temperature sensor. In other examples, measuring the second measured temperature includes measuring a temperature with a single temperature sensor. In yet other examples, measuring the second measured temperature includes aggregating a plurality of temperature measurements, such as described herein.

The method further includes adjusting the first measured temperature based on the second measured temperature and the position of the secondary heat source according to the posture data to create a component temperature. In some implementations, adjusting the first measured temperature includes performing a weighted average on the first measured temperature with the second measured temperature based upon posture data. In some implementations, adjusting the first measured temperature includes comparing the first measured temperature to a lookup table and correlating the first measured temperature to a component temperature based on the second measured temperature. For example, a first measured temperature of 140° F. may correlate to a component temperature of 120° F. when the second measured temperature of the secondary heat source is 160° F.

In some examples, the lookup table includes posture data. For example, a first measured temperature of 140° F. when the electronic device is in an inverted posture and the secondary heat source has a second measured temperature of 140° F. may correlate to a 120° F. component temperature.

After creating the component temperature, the component temperature can be optionally used to adjust a performance of the component, similarly to as described herein. In some implementations, the method includes adjusting the performance of a second component in response to the posture data and component temperature. In at least one implementation, the second component is the secondary heat source.

In some examples, the battery cell has a temperature above an upper threshold, at least partially because a processor (CPU, GPU, etc.) or other heat source is generating thermal energy. Reducing an operating current or frequency of the processor (CPU, GPU, etc.), memory, display, or other heat-generating components can reduce the exposure of the battery cell to the additional thermal energy of the secondary heat source. In at least one example, the battery PCM can determine the amount of power available at the given battery cell component temperature and provide that power availability information to the processor or other microcontroller of the electronic device. The overall performance of the electronic device can be adjusted based on the power availability information.

The present disclosure relates to systems and methods for measuring a temperature of an electronic component in an electronic device according to at least the examples provided in the sections below:

1. A method of calculating component temperature in an electronic device (e.g., electronic device 100; FIG. 1), the method comprising: obtaining (e.g., obtaining . . . 438; FIG. 8) a posture of the electronic device;
    selecting (e.g., selecting . . . 440; FIG. 8) a first temperature sensor from a plurality of temperature sensors based on the posture of the electronic device;
    obtaining (e.g., obtaining . . . 442; FIG. 8) a first measured temperature of a component with at least the first temperature sensor;
    determining (e.g., determining . . . 444; FIG. 8) whether to adjust the first measured temperature based on the posture of the electronic device; and if an adjustment is determined to be needed, adjusting (e.g., adjusting . . . 446; FIG. 8) the first measured temperature to create a component temperature.

2. The method of section 1, wherein the component is a battery cell (e.g., battery cell 216; FIG. 2).

3. The method of section 1 or 2, wherein the posture of the electronic device includes an angular relationship of a first portion (e.g., first portion 202; FIG. 3) and a second portion (e.g., second portion 204; FIG. 3) of the electronic device.

4. The method of any of sections 1-3, wherein the posture of the electronic device includes an orientation of the electronic device relative to a direction of gravity.

5. The method of any of sections 1-4, wherein obtaining a posture of the electronic device includes measuring a posture sensor (e.g., posture sensor 228; FIG. 3) in a hinge (e.g., hinge 230; FIG. 3) of the electronic device.

6. The method of any of sections 1-5, wherein determining whether to adjust the first measured temperature further including determining whether an angular relationship of a first portion and a second portion of the electronic device are below a closed threshold or above an inverted threshold.

7. The method of any of sections 1-6, wherein adjusting the first measured temperature includes multiplying the first measured temperature by a coefficient based at least partially upon an angular relationship of a first portion and a second portion of the electronic device.

8. The method of any of sections 1-7 further comprising adjusting (e.g., adjusting . . . 448; FIG. 8) a performance of the component based upon the component temperature.

9. The method of any of sections 1-8, further comprising adjusting (e.g., adjusting . . . 448; FIG. 3) a performance of a second component of the electronic device based upon the component temperature.

10. The method of any of sections 1-9, wherein obtaining a first measured temperature further includes obtaining a second measured temperature and aggregating the first measured temperature and the second measured temperature.

11. The method of section 10, wherein aggregating the first measured temperature and the second measured temperature includes calculating a weighted average of the first measured temperature and the second measured temperature.

12. The method of section 10, wherein aggregating the first measured temperature and the second measured temperature includes comparing the first measured temperature and the second measured temperature and selecting a lesser value of the first measured temperature and the second measured temperature.

13. The method of section 10, wherein aggregating the first measured temperature and the second measured temperature includes comparing the first measured temperature and the second measured temperature and selecting a greater value of the first measured temperature and the second measured temperature.

14. A method of calculating component temperature in an electronic device, the method comprising:
obtaining (e.g., obtaining . . . 538; FIG. 9) a posture of the electronic device;
measuring (e.g., measuring . . . 542; FIG. 9) a first temperature of a component using a first temperature sensor;
measuring (e.g., measuring... 550; FIG. 9) a second temperature of a secondary heat source in the electronic device using a second temperature sensor;
adjusting (e.g., adjusting . . . 552; FIG. 9) the first temperature based on the second temperature of the secondary heat source and the position of the secondary heat source according to the posture of the electronic device to create a component temperature; and
adjusting (e.g., adjusting . . . 548; FIG. 9) a performance of the component based upon the component temperature.

15. The method of section 14, wherein the component is a battery cell (e.g., battery cell 216; FIG. 2).

16. The method of sections 14 or 15, wherein the first temperature sensor (e.g., temperature sensor 218; FIG. 2) is positioned in physical contact with the component (e.g., battery PCM 220; FIG. 2) in a second portion (e.g., second portion 204; FIG. 2) of the electronic device.

17. The method of any of sections 14-16, wherein the second temperature sensor (e.g., second temperature sensor 225; FIG. 3) is located in a first portion (e.g., first portion 202; FIG. 3) of the electronic device where the first portion and second portion are movable relative to one another.

18. The method of section 17, wherein the posture of the electronic device includes a distance of the secondary heat source (e.g., first heat source 222-1; FIG. 3) from the first temperature sensor (e.g., first temperature sensor 224; FIG. 3).

19. An electronic device, the electronic device comprising:
a first portion (e.g., first portion 202; FIG. 3);
a second portion (e.g., second portion 204; FIG. 3) rotatable relative to the first portion around a hinge (e.g., hinge 230; FIG. 3);
a battery cell (e.g., first battery cell 216-1; FIG. 3) located in the second portion;
a first temperature sensor (e.g., first temperature sensor 224; FIG. 3) positioned adjacent the battery cell and configured to measure a first temperature;
a battery PCM (e.g., battery PCM 220; FIG. 2) in electrical communication with the battery cell;
a second temperature sensor (e.g., second temperature sensor 226; FIG. 3);
a posture sensor (e.g., posture sensor 228; FIG. 3) configured to measure the angular position of the first portion relative to the second portion;
a processor (e.g., processor 306; FIG. 7) in data communication with the first temperature sensor, the second temperature sensor, and the posture sensor; and
a hardware storage device (e.g., storage device 334; FIG. 7) having instructions stored thereon that, when executed by the processor, cause the processor to:
obtain (e.g., obtaining . . . 438; FIG. 8) a posture of the electronic device,
select (e.g., selecting . . . 440; FIG. 8) a first temperature sensor from a plurality of temperature sensors,
obtain (e.g., obtaining . . . 442; FIG. 8) a first measured temperature of a component with at least the first temperature sensor,
determine (e.g., determining . . . 446; FIG. 8) whether to adjust the first measured temperature based on the posture of the electronic device, and if an adjustment is determined to be needed, adjust (e.g., adjusting . . . 448; FIG. 8) the first measured temperature to create a component temperature.

20. The electronic device of section 19, wherein the instructions further comprise:
adjust (e.g., adjusting . . . 448; FIG. 8) a performance of the component based upon the component temperature.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of determining a temperature of a component in an electronic device, the method comprising:
obtaining a posture of the electronic device;
selecting a first temperature sensor from a plurality of temperature sensors based on the obtained posture;
obtaining a first measured temperature from the first temperature sensor;
determining the temperature of the component based on the first measured temperature from the first temperature sensor; and
in accordance with the determined temperature meeting one or more criteria, adjusting performance of the component.

2. The method of claim 1, wherein the component is a battery cell.

3. The method of claim 1, wherein the posture of the electronic device includes an angular relationship of a first portion and a second portion of the electronic device.

4. The method of claim 1, wherein the posture of the electronic device includes an orientation of the electronic device relative to a direction of gravity.

5. The method of claim 1, wherein obtaining a posture of the electronic device includes measuring a posture sensor in a hinge of the electronic device.

6. The method of claim 1, wherein determining whether to adjust the first measured temperature further includes determining whether an angular relationship of a first portion and a second portion of the electronic device are below a closed threshold or above an inverted threshold.

7. The method of claim 1, wherein adjusting the first measured temperature includes multiplying the first measured temperature by a coefficient based at least partially upon an angular relationship of a first portion and a second portion of the electronic device.

8. The method of claim 1 further comprising determining whether to adjust the first measured temperature based on the posture.

9. The method of claim 1 further comprising adjusting a performance of a second component of the electronic device based upon the determined temperature.

10. The method of claim 1, wherein determining the temperature of the component further includes obtaining a second measured temperature from a second temperature sensor of the plurality of temperature sensors and aggregating the first measured temperature and the second measured temperature.

11. The method of claim 10, wherein aggregating the first measured temperature and the second measured temperature includes calculating a weighted average of the first measured temperature and the second measured temperature.

12. The method of claim 10, wherein aggregating the first measured temperature and the second measured temperature includes comparing the first measured temperature and the second measured temperature and selecting a lesser value of the first measured temperature and the second measured temperature.

13. The method of claim 10, wherein aggregating the first measured temperature and the second measured temperature includes comparing the first measured temperature and the second measured temperature and selecting a greater value of the first measured temperature and the second measured temperature.

14. A method of calculating component temperature in an electronic device, the method comprising:
obtaining a posture of the electronic device;
selecting a first temperature sensor from a plurality of temperature sensors based on the obtained posture;
obtaining a first measured temperature from the first temperature sensor;

obtaining a second measured temperature from a second temperature sensor of the plurality of temperature sensors;

determining the temperature of the component by calculating a weighted average of the first measured temperature and the second measured temperature; and in accordance with the determined temperature meeting one or more criteria, adjusting performance of the component.

15. The method of claim 14, wherein calculating the weighted average includes applying a coefficient of zero to one of the first measured temperature and the second measured temperature.

16. The method of claim 14, wherein the first temperature sensor is positioned in physical contact with the component in a first portion of the electronic device.

17. The method of claim 16, wherein the second temperature sensor is located in a second portion of the electronic device where the first portion and second portion are movable relative to one another.

18. The method of claim 17, wherein the posture includes a distance of the secondary heat source from the first temperature sensor.

19. An electronic device, the electronic device comprising:
   a first portion;
   a second portion rotatable relative to the first portion around a hinge;
   a battery cell located in the second portion;
   a first temperature sensor positioned adjacent the battery cell and configured to measure a first temperature;
   a battery protection circuit module (PCM) in electrical communication with the battery cell;
   a second temperature sensor;
   a posture sensor configured to measure an angular position of the first portion relative to the second portion;
   a processor in data communication with the first temperature sensor, the second temperature sensor, and the posture sensor; and
   a hardware storage device having instructions stored thereon that, when executed by the processor, cause the processor to:
      obtain a posture of the electronic device,
      select a first temperature sensor from a plurality of temperature sensors based on the obtained posture,
      obtain a first measured temperature from the first temperature sensor,
      obtain a second measured temperature from a second temperature sensor of the plurality of temperature sensors, and
      determine the temperature of the component by calculating a weighted average of the first measured temperature and the second measured temperature.

20. The electronic device of claim 19, wherein the instructions further comprise:
   adjust a performance of the component based upon the component temperature.

* * * * *